(12) United States Patent
Umesawa

(10) Patent No.: US 11,321,390 B2
(45) Date of Patent: May 3, 2022

(54) VIDEO DATA GENERATION APPARATUS, VIDEO DATA GENERATION METHOD, AND PROGRAM

(71) Applicant: CANON KABUSHIKI KAISHA, Tokyo (JP)

(72) Inventor: Takeo Umesawa, Yokohama (JP)

(73) Assignee: Canon Kabushiki Kai sha, Tokyo (JP)

( * ) Notice: Subject to any disclaimer, the term of this patent is extended or adjusted under 35 U.S.C. 154(b) by 448 days.

(21) Appl. No.: 16/541,983

(22) Filed: Aug. 15, 2019

(65) Prior Publication Data

US 2020/0073887 A1 Mar. 5, 2020

(30) Foreign Application Priority Data

Sep. 4, 2018 (JP) .............................. JP2018-165065

(51) Int. Cl.
| | | |
|---|---|---|
| *G06F 16/732* | (2019.01) | |
| *G06F 16/783* | (2019.01) | |
| *H04N 19/132* | (2014.01) | |
| *H04N 19/61* | (2014.01) | |
| *H04N 21/44* | (2011.01) | |
| *H04N 21/2343* | (2011.01) | |
| *H04N 19/137* | (2014.01) | |
| *H04N 19/146* | (2014.01) | |

(Continued)

(52) U.S. Cl.
CPC ...... *G06F 16/7328* (2019.01); *G06F 16/7837* (2019.01); *H04N 19/132* (2014.11); *H04N 19/61* (2014.11); *H04N 21/44008* (2013.01); *H04N 21/234381* (2013.01)

(58) Field of Classification Search
CPC . G06F 16/7328; G06F 16/7837; H04N 19/61; H04N 21/44008; H04N 21/234381; H04N 19/132; H04N 19/137; H04N 19/146; H04N 19/17; H04N 19/172; H04N 19/124; H04N 5/23218; H04N 19/587
See application file for complete search history.

(56) References Cited

U.S. PATENT DOCUMENTS

| | | | |
|---|---|---|---|
| 9,948,944 B2 * | 4/2018 | Igarashi | H04N 19/57 |
| 2007/0140340 A1 * | 6/2007 | Tsukuda | H04N 19/573 |
| | | | 375/240.12 |

(Continued)

FOREIGN PATENT DOCUMENTS

JP 2006115470 A 4/2006

*Primary Examiner* — Asghar H Bilgrami
(74) *Attorney, Agent, or Firm* — Canon U.S.A., Inc. IP Division

(57) ABSTRACT

A frame rate determination unit determines a frame rate of video data. A code amount determination unit determines a target code amount that can be used in each frame of the video data. An encoding unit performs generation processing for generating video data according to the frame rate and the code amount. When the frame rate determination unit changes the frame rate from a first frame rate to a second frame rate, the code amount determination unit makes at least a target code amount in a frame immediately before the first frame smaller than when the frame rate is not changed from the first frame rate to the second frame rate in the first frame, and makes a target code amount in the first frame greater than when the frame rate is not changed from the first frame rate to the second frame rate in the first frame.

11 Claims, 10 Drawing Sheets

(51) Int. Cl.
*H04N 19/17* (2014.01)
*H04N 19/587* (2014.01)
*H04N 19/124* (2014.01)
*H04N 5/232* (2006.01)
*H04N 19/172* (2014.01)

(56) References Cited

U.S. PATENT DOCUMENTS

2017/0070734 A1* 3/2017 Kanou ................. H04N 19/115
2017/0075416 A1* 3/2017 Armstrong .......... H04L 65/1063

* cited by examiner

VIDEO DATA GENERATION APPARATUS, VIDEO DATA GENERATION METHOD, AND PROGRAM

BACKGROUND OF THE INVENTION

Field of the Invention

The present disclosure relates to a video data generation apparatus, a video data generation method, and a program.

Description of the Related Art

Conventionally, a network camera that distributes a moving image (video) through a network uses a method of suppressing an amount of code of the video to be distributed by deleting a redundant part for a user. As the method of suppressing the amount of code of the video to be distributed, a method of controlling a frame rate of the video to be distributed according to the presence or absence of a moving object in the video is known.

Japanese Patent Laid-Open No. 2006-115470 discloses a technology that detects a moving object from a video and determines a frame rate by evaluating smoothness of motion of the moving object.

In the technology described in Japanese Patent Laid-Open No. 2006-115470, when an evaluation value for evaluating the smoothness of motion of the moving object is greater than a specified value, the frame rate is set to a slow frame rate, and when the evaluation value is smaller than the specified value, the frame rate is set to a fast frame rate. However, in the technology described in Japanese Patent Laid-Open No. 2006-115470, the image quality of an image distributed at the slow frame rate and the image quality of an image distributed at the fast frame rate are treated equally.

When the frame rate is the slow frame rate, screen update is slower than when the frame rate is the fast frame rate, so that if the image quality of the distributed image is low, the low quality image is presented to a user over a long time, and an impression that the image quality is degraded is presented to the user.

SUMMARY OF THE INVENTION

Therefore, in order to suppress degradation of video image quality when the frame rate is controlled to a second frame rate lower than a first frame rate while realizing reduction of the entire amount of code of the video by frame rate control, the present disclosure has, for example, the following configuration.

A video data generation apparatus, which performs generation processing for generating video data, includes a frame rate determination unit that determines a frame rate of the video data, a code amount determination unit that determines a target code amount that can be used in each frame of the video data, and an encoding unit that performs the generation processing for generating the video data according to the frame rate determined by the frame rate determination unit and the code amount determined by the code amount determination unit. When the frame rate determination unit changes, in a first frame, the frame rate of the video data from a first frame rate to a second frame rate lower than the first frame rate, the code amount determination unit makes at least a target code amount in a frame immediately before the first frame smaller than when the frame rate is not changed from the first frame rate to the second frame rate in the first frame, and makes a target code amount in the first frame greater than when the frame rate is not changed from the first frame rate to the second frame rate in the first frame.

Further features of the present disclosure will become apparent from the following description of exemplary embodiments (with reference to the attached drawings).

DESCRIPTION OF THE EMBODIMENTS

Hereinafter, embodiments for carrying out the present disclosure will be described in detail with reference to the drawings.

The embodiments described below are examples of an implementation unit of the present disclosure and should be appropriately corrected or changed according to a configuration and various conditions of an apparatus to which the present disclosure is applied. The present disclosure is not limited to the embodiments described below.

Figure 1:
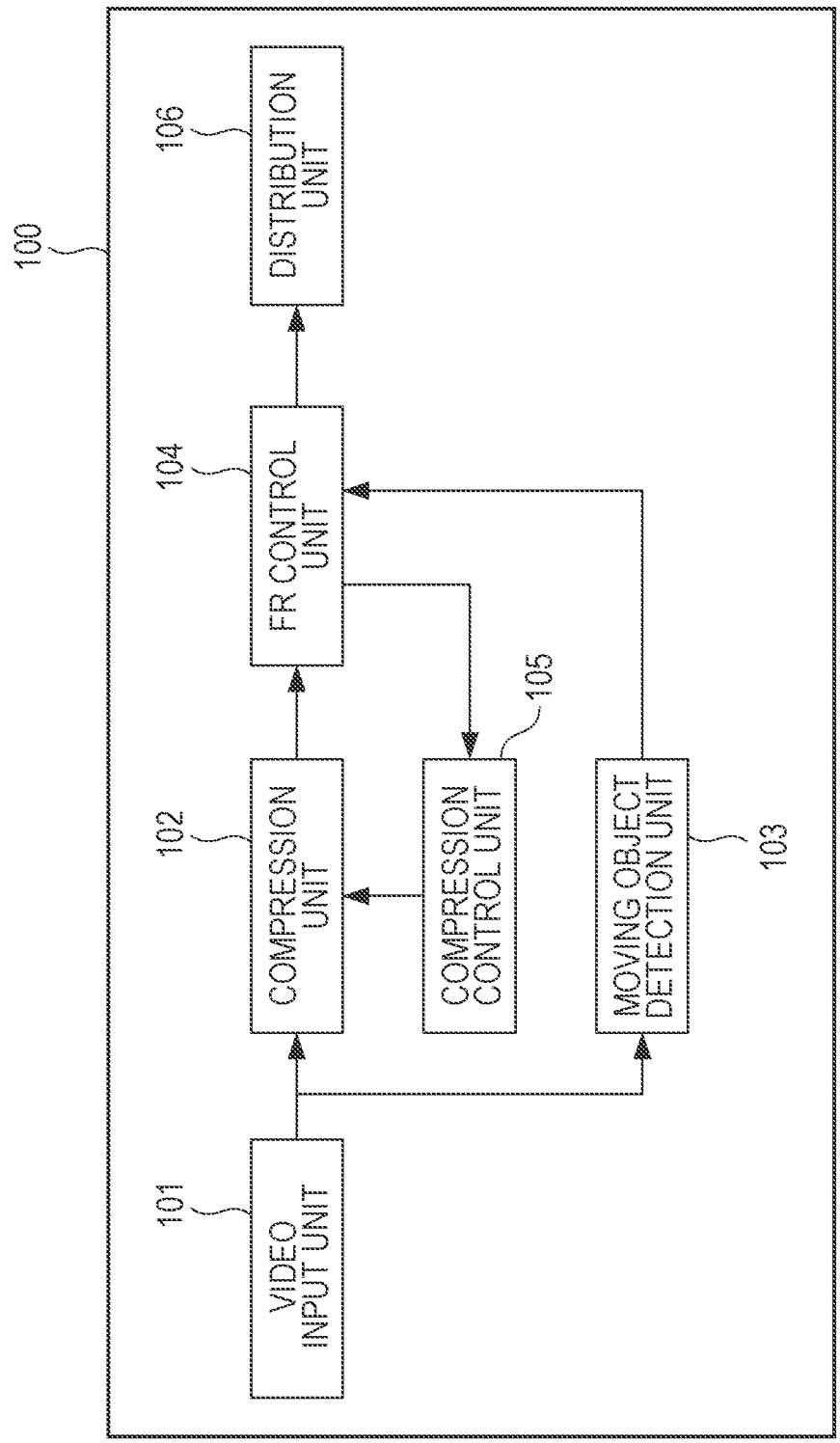
FIG. 1 is a diagram showing a block configuration example of an image processing apparatus according to an embodiment.

FIG. 1 is a diagram showing a block configuration example of an image processing apparatus (video data generation apparatus) 100 according to an embodiment.

The image processing apparatus 100 is a moving image compression apparatus that compresses a moving image (video) composed of consecutive frames on a time-series. In the present embodiment, a case will be described where a network camera used as an abnormality monitoring system operates as the image processing apparatus 100. The network camera captures an image of a predetermined monitoring area and distributes a captured video to a client apparatus through a network. In this case, the network camera detects a moving object from the captured video, determines a frame rate of the video to be distributed based on moving object information related to the detected moving object, and performs a frame rate control that controls the frame rate.

As shown in FIG. 1, the image processing apparatus 100 includes a video input unit 101, a compression unit 102, a moving object detection unit 103, an FR control unit 104, a compression control unit 105, and a distribution unit 106.

The video input unit 101 acquires video data to be compressed and distributed and outputs the acquired video data to the compression unit 102 and the moving object detection unit 103.

The compression unit 102 compresses the video inputted from the video input unit 101 according to a compression control of the compression control unit 105 and outputs compressed data to the FR control unit 104. Here, a compression method of the video may be a compression method using in-frame correlation (in-frame prediction), a compression method using interframe correlation (interframe prediction), or a compression method combining these methods. For example, as the compression method of the video, it is possible to use an encoding method compatible with H.264. However, the compression method of the video is not limited to the above methods, but any compression method may be used.

The moving object detection unit 103 detects a moving object from the video inputted from the video input unit 101 and outputs moving object information, which is a result of the moving object detection, to the FR control unit 104. For example, the moving object detection unit 103 can use a background subtraction where a difference between an inputted image (frame) and a background image created from an image inputted in the past is detected as a moving object.

The FR control unit 104 determines the frame rate of the video to be distributed based on moving object information inputted from the moving object detection unit 103. The FR control unit 104 determines the frame rate by selecting a frame rate mode from, for example, the following three modes based on the moving object information.

(1) Fast frame rate mode: A mode where a moving object exists in a video. The frame rate may be a fixed value such as, for example, 30 fps (frames/sec) or may be variable according to velocity of motion of the moving object. Hereinafter, the frame rate in the fast frame rate mode is referred to as "fast frame rate", and the fast frame rate mode is referred to as "fast mode".

(2) Slow frame rate mode: A mode where no moving object exists in a video. The frame rate may be a value lower than the fast frame rate and, for example, may be 0.1 fps or 0.001 fps. Moreover, the frame rate may be 0 fps. Here, 0 fps may be simulatively achieved by sending a pseudo frame including no image information. Hereinafter, the frame rate in the slow frame rate mode is referred to as "slow frame rate", and the slow frame rate mode is referred to as "slow mode".

(3) Transition frame rate mode: A mode where a frame rate is gradually reduced over a predetermined time period when it is determined that an image where a moving object exists transits to an image where no moving object exists and the frame rate should be switched from the fast frame rate to the slow frame rate. Here, the predetermined time period may be set according to statistic information of moving object detection (detection frequency of a moving object) or may be uniformly set to, for example, two seconds or the like. The frame rate may be a function that connects the fast frame rate and the slow frame rate with a linear or logarithmic function and temporally varies between them or may simply be a constant between the slow frame rate and the fast frame rate. Hereinafter, the frame rate in the transition frame rate mode is referred to as "transition frame rate" and the transition frame rate mode is referred to as "transition mode".

The compression control unit 105 is inputted with the frame rate mode determined by the FR control unit 104 and controls the compression unit 102 according to the inputted mode. Specifically, the compression control unit 105 sets a quantization value (Q value) representing a quantization amount when compressing an image according to the frame rate mode inputted from the FR control unit 104 and outputs the quantization value to the compression unit 102. At this time, the compression control unit 105 controls the quantization value to improve image quality in the slow mode by increasing the amount of code of video to be distributed at the slow frame rate to be greater than a specified value within a range where the entire amount of code of the video to be distributed does not exceed a target amount of code. Details of a compression control method of the compression control unit 105 will be described later.

The distribution unit 106 distributes a compressed video to a network not shown in the drawings according to the frame rate determined by the FR control unit 104.

Figure 2:
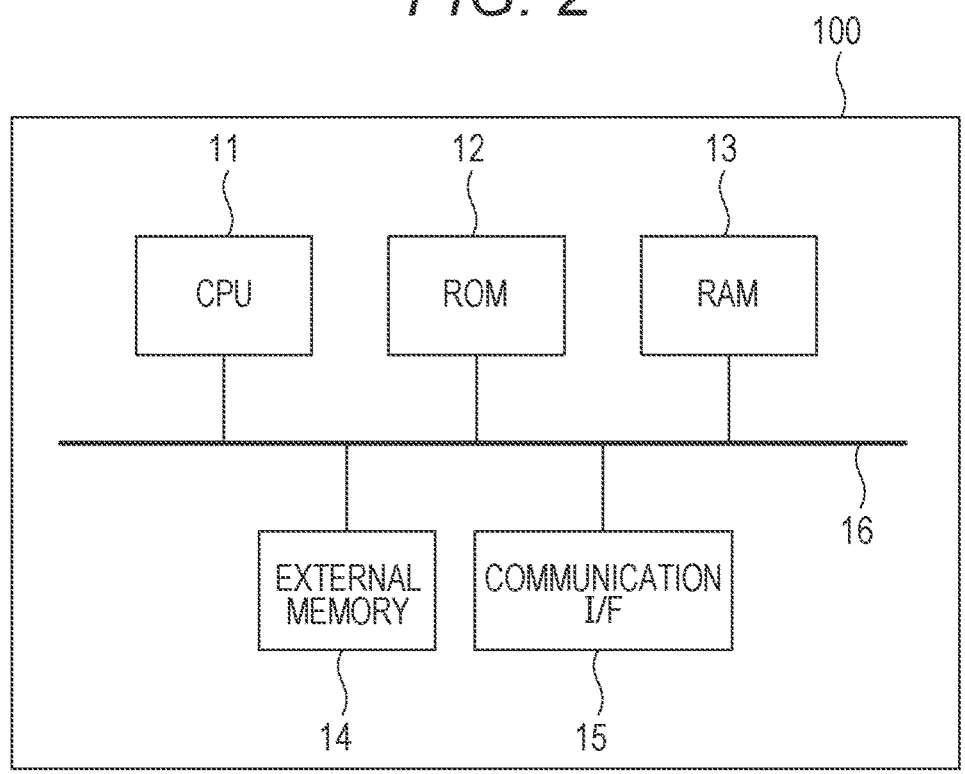
FIG. 2 is a hardware configuration example of the image processing apparatus.

FIG. 2 is a hardware configuration example of the image processing apparatus 100.

The image processing apparatus 100 includes a CPU 11, a ROM 12, a RAM 13, an external memory 14, a communication I/F 15, and a system bus 16.

The CPU 11 integrally controls operation of the image processing apparatus 100. The ROM 12 is a non-volatile memory that stores a control program necessary for the CPU 11 to perform processing. The program may be stored in the external memory 14 or an attachable/detachable storage medium not shown in the drawings. The RAM 13 functions as a main memory, a work area, and the like of the CPU 11. The CPU 11 loads necessary program and the like from the ROM 12 to the RAM 13 when performing processing and implements various functional operations by executing the program and the like.

The external memory 14 stores, for example, various data, various information, and the like that are required when the CPU 11 performs processing using a program. Further, the external memory 14 stores various data, various information, and the like that are obtained when the CPU 11 performs processing using a program. The communication I/F 15 provides a wired or wireless communication interface with an external device.

Functions of some or all of elements of the image processing apparatus 100 shown in FIG. 1 can be realized when the CPU 11 executes a program. However, at least some of the elements of the image processing apparatus 100 shown in FIG. 1 may operate as dedicated hardware. In this case, the dedicated hardware operates under control of the CPU 11.

In the present embodiment, the network camera operates as the image processing apparatus 100. Therefore, in the present embodiment, the image processing apparatus 100 can include an image capturing unit as a hardware configuration. Here, the image capturing unit includes a lens unit and an image capturing element that constitute an image capture optical system. The image capturing element includes a CCD sensor, a CMOS sensor, or the like and converts an image formed on a light receiving surface of the image capturing element into an electrical signal.

In the present embodiment, a case will be described where the network camera operates as the image processing apparatus 100. However, a usual PC or another device may operate as the image processing apparatus 100.

Hereinafter, the compression control method of the compression control unit 105 will be specifically described.

Figure 3:
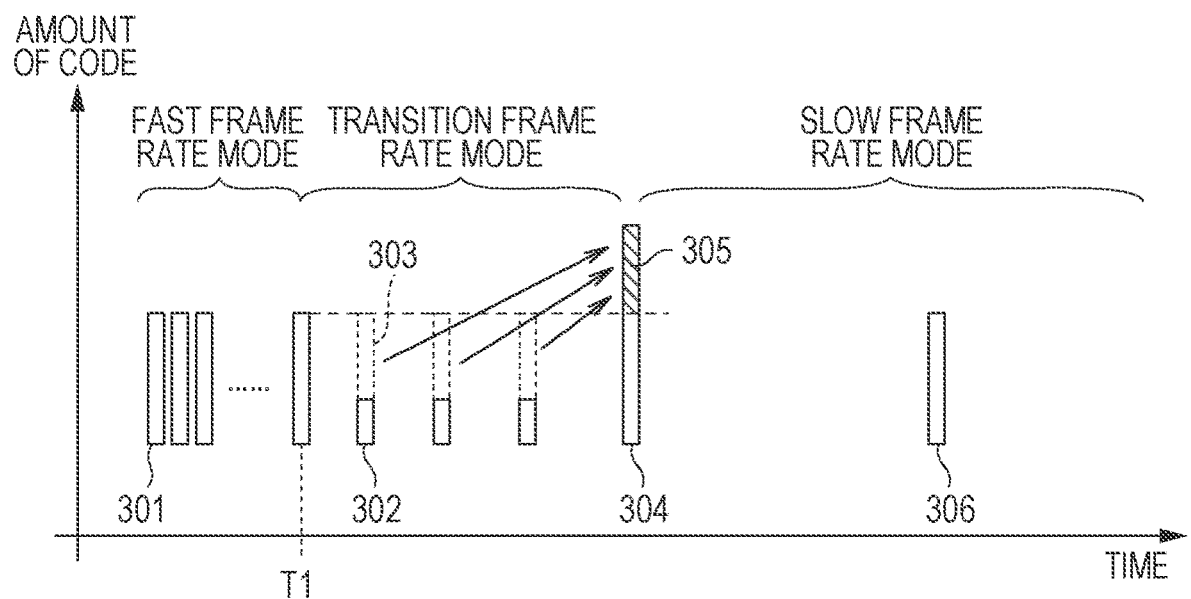
FIG. 3 is a conceptual diagram of moving image compression according to a first embodiment.

FIG. 3 is a conceptual diagram of moving image compression according to the present embodiment and is a diagram where the vertical axis represents an amount of code of each image (frame) distributed by the image processing apparatus 100 and the horizontal axis represents time.

When a moving object exists in a video, the image processing apparatus 100 distributes the video in the fast mode. When the image processing apparatus 100 detects that no moving object exists in the video, the image processing apparatus 100 transits from the fast mode to the transition mode and thereafter transits to the slow mode. FIG. 3 shows a case where the image processing apparatus 100 detects that no moving object exists in the video at time T1.

In this way, when the image processing apparatus 100 detects a moving object from the video, the image processing apparatus 100 controls the frame rate to the fast frame rate and presents a user with a smooth motion of a subject. At this time, the image processing apparatus 100 can determine the fast frame rate according to the velocity of the moving object. When the image processing apparatus 100 detects no moving image from the video, the image processing apparatus 100 switches the frame rate from the fast frame mode to the slow frame mode and suppresses the amount of code by deleting redundant portions for the user. Further, the image processing apparatus 100 sets the transition mode and transits to the transition mode when moving from the fast mode to the slow mode. Thereby, it is possible to cope with a video in which a change between static and dynamic is extreme such as a video in which a state where there is a motion of a subject changes to a state where there is no motion of the subject and immediately thereafter returns to a state where there is a motion of the subject.

An amount of code 301 is an amount of code of a frame to be distributed in the fast mode. When a motion of the subject disappears in a frame distributed at time T1, thereafter the frame rate mode becomes the transition mode. In the transition mode, a transitional frame rate and an amount of code for causing the image processing apparatus 100 to transit from the fast mode to the slow mode are set. As described above, the transition frame rate may be a fixed value or, for example, may be made to gradually approach the slow frame rate from the fast frame rate by a logarithmic function.

An amount of code 302 of a frame to be distributed in the transition mode is more suppressed than the amount of code 301 in the fast mode. The compression control unit 105 of the image processing apparatus 100 strongly performs compression by making a quantization value in the transition mode greater than a quantization value in the fast mode by, for example, three, and suppresses the amount of code. The compression control unit 105 suppresses the amount of code as described above from the first frame to a frame immediately before the last frame of the transition mode.

The compression control unit 105 assigns the amount of code suppressed in the transition mode to the last frame of the transition mode. Specifically, the compression control unit 105 totals differential code amounts 303 between an average of the amounts of code 301 in the fast mode and the amount of code 302 in the transition mode of frames from the first frame to the frame immediately before the last frame of the transition mode. The compression control unit 105 controls a quantization value for the last frame so that a total value of the differential code amounts 303 is assigned to the last frame.

Thereby, an amount of code 304 of the last frame becomes a value greater than an amount of code 306 that is a specified value in the slow mode by a total code amount 305 shown by oblique lines. Therefore, it is possible to transit to the slow mode in a state where the image quality is improved.

Here, the specified value in the slow mode is an amount of code of a frame compressed according to a quantization value for the slow frame rate. In the present embodiment, the quantization value for the slow frame rate may be the same as a quantization value for the fast frame rate.

Next, an operation of the image processing apparatus 100 according to the present embodiment will be described.

Figure 4:
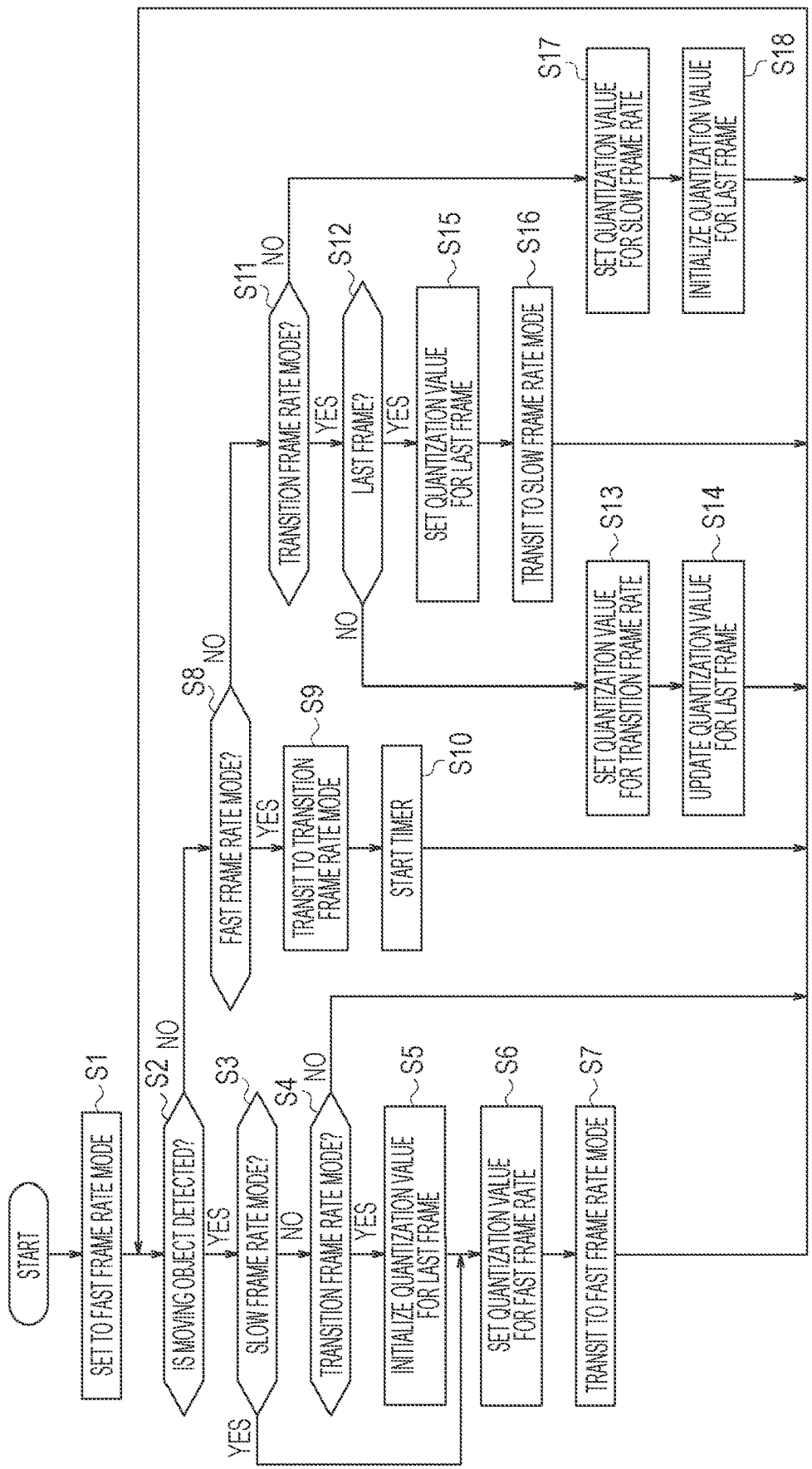
FIG. 4 is a flowchart showing a procedure of moving image compression processing of the first embodiment.

FIG. 4 is a flowchart showing a procedure of moving image compression processing performed by the image processing apparatus 100. The moving image compression processing is processing that improves image quality in the slow mode when performing frame rate control that changes a frame rate based on moving object information in a video. The processing of FIG. 4 is started at a timing when the image processing apparatus 100 is started. However, a start timing of the processing of FIG. 4 is not limited to the aforementioned timing. The image processing apparatus 100 can implement each processing shown in FIG. 4 when the CPU 11 reads and executes a necessary program. Hereinafter, an alphabet character "S" means a step in the flowchart.

First, in S1, the FR control unit 104 performs initialization and selects the fast mode as the frame rate mode.

Next, in S2, the FR control unit 104 is inputted with the moving object information from the moving object detection unit 103 and determines whether a moving object is detected from a video. When the moving object is detected, the FR control unit 104 proceeds to S3, and when no moving object is detected, the FR control unit 104 proceeds to S8. In S3, the FR control unit 104 determines whether a current frame rate mode is the slow mode. When determining that the current frame rate mode is not the slow mode, the FR control unit 104 proceeds to S4, and when determining that the current frame rate mode is the slow mode, the FR control unit 104 proceeds to S6.

In S4, the FR control unit 104 determines whether the current frame rate mode is the transition mode. When determining that the current frame rate mode is not the transition mode, the FR control unit 104 directly returns to S2 because the current frame rate mode is the fast mode. On the other hand, when determining that the current frame rate mode is the transition mode in S4, the FR control unit 104 proceeds to S5. In S5, the compression control unit 105 initializes the quantization value for the last frame and proceeds to S6. Here, the quantization value for the last frame is a quantization value to be applied to the last frame of the transition mode.

In S6, the compression control unit 105 sets the quantization value for the fast frame rate to the compression unit 102 and proceeds to S7. In S7, the FR control unit 104 sets the frame rate to the fast frame rate, transits to the fast mode, and returns to S2.

In S8, the FR control unit 104 determines whether the current frame rate mode is the fast mode. When determining that the current frame rate mode is the fast mode, the FR control unit 104 proceeds to S9, and when determining that the current frame rate mode is not the fast mode, the FR control unit 104 proceeds to S11. In S9, the FR control unit 104 sets the frame rate to the transition frame rate, transits from the fast mode to the transition mode, and proceeds to S10. In S10, the FR control unit 104 starts a timer for ending the transition mode and returns to S2.

In S11, the FR control unit 104 determines whether the current frame rate mode is the transition mode. When determining that the current frame rate mode is the transition mode, the FR control unit 104 proceeds to S12, and when determining that the current frame rate mode is not the transition mode, the FR control unit 104 proceeds to S17.

In S12, the FR control unit 104 determines whether a frame to be processed is the last frame of the transition mode. The FR control unit 104 can determine whether the frame to be processed is the last frame of the transition mode based on the timer set in S10. When determining that the frame to be processed is not the last frame of the transition mode, the FR control unit 104 proceeds to S13, and the compression control unit 105 sets a quantization value for the transition frame rate to the compression unit 102 and proceeds to S14.

In S14, the compression control unit 105 updates the quantization value for the last frame and returns to S2. In S14, the compression control unit 105 accumulates a difference between an amount of code of a frame compressed according to the quantization value for the transition frame rate and an amount of code of a frame compressed according to the quantization value for the fast frame rate. Then, the compression control unit 105 obtains the quantization value for the last frame so that the accumulated differential code amount becomes an amount of code to be added to the amount of code of the last frame and updates the quantization value for the last frame. The quantization value Qf for the last frame can be calculated based on, for example, the following formula.

[Expression 1]

$$Qf = Qk + \log_\beta\left(1 + \frac{\alpha \sigma_{k=0}^{n} bk}{a}\right) \quad (1)$$

Here, α and β are efficiency, a is an average of amounts of code per frame in the transition mode, n is the number of frames in the transition mode, bk is a difference between an average of amounts of code per frame in the fast mode and an amount of code of a k-th frame in the transition mode, and Qk is a quantization value in the transition mode. Here, α is an efficiency when the differential code amounts of a plurality of frames are pushed into one frame and is, for example, 0.3. Here, β is a value representing an efficiency of quantization such as a degree of change in the amount of code when the quantization value is incremented by 1 and is, for example, 0.88. Regarding α and β, it is possible to dynamically calculate prediction values for them respectively. In this case, it is possible to dynamically calculate the prediction values based on, for example, initial values of α=0.3 and β=0.88, an obtained amount of code, a set quantization value, and the number of transition frames n by using, for example, a Kalman filter.

In S12, when determining that the frame to be processed is the last frame of the transition mode, the FR control unit 104 proceeds to S15, and the compression control unit 105 sets the quantization value for the last frame that is finally updated in S14 to the compression unit 102 and proceeds to S16. In S16, the FR control unit 104 sets the frame rate to the slow frame rate, transits from the transition mode to the slow mode, and returns to S2.

In S17, the compression control unit 105 sets the quantization value for the slow frame rate to the compression unit 102 and proceeds to S18. In S18, the compression control unit 105 initializes the quantization value for the last frame and returns to S2.

As described above, the image processing apparatus 100 according to the present embodiment acquires a video composed of consecutive frames on a time-series and compresses and distributes the acquired video. At this time, the image processing apparatus 100 detects a moving object from the video, determines a frame rate at which the compressed video is distributed based on moving object information related to the detected moving object, and distributes the video according to the determined frame rate. Further, the image processing apparatus 100 controls the compression unit 102 and increases the amount of code of the frame to be distributed at the slow frame rate to be greater than the specified value within a range where the amount of code of the video to be distributed does not exceed the target amount of code.

Thereby, the image processing apparatus 100 can improve the image quality at the slow frame rate while realizing reduction of the amount of code of the video by the frame rate control.

The image processing apparatus 100 has the fast frame rate mode (fast mode), the slow frame rate mode (slow mode), and the transition frame rate mode (transition mode) as the frame rate mode. The image processing apparatus 100 increases the amount of code of the last frame among the frames to be distributed at the transitional frame rate to be greater than the specified value, so that the image processing apparatus 100 increases the amount of code of the first frame to be distributed at the slow frame rate to be greater than the specified value.

In this way, the amount of code of the last frame of the transition mode, which is the last frame of the frames during a period changing from the fast mode to the slow mode, is increased, so that it is possible to appropriately improve the image quality of the first frame of the slow mode.

Further, the image processing apparatus 100 controls the compression unit 102 and suppresses the amounts of code of frames except for the last frame among the frames to be distributed at the transitional frame rate, and appropriates the suppressed amounts of code for the last frame.

In this way, the amounts of code of the frames of the transition mode are suppressed by quantization value control and the suppressed amounts of code are appropriated for the last frame. Therefore, it is possible to improve the image quality at the slow frame rate without increasing the entire amount of code of the video from the amount of code (the target amount of code) in a case where the quantization value control is not performed.

As described above, in the present embodiment, it is possible to improve the image quality at the slow frame rate when the frame rate control is performed. Therefore, while the reduction of the entire amount of code of the video is realized by the frame rate control, it is possible to hardly give an impression of degradation of image quality of the video on a user when the control is transited to the slow frame rate lower than the fast frame rate.

Second Embodiment

Next, a second embodiment of the present disclosure will be described.

In the second embodiment, the frame rate of the transition mode is adjusted so that the last frame of the transition mode becomes a frame compressed by using the in-frame correlation (in-frame prediction).

Figure 5:
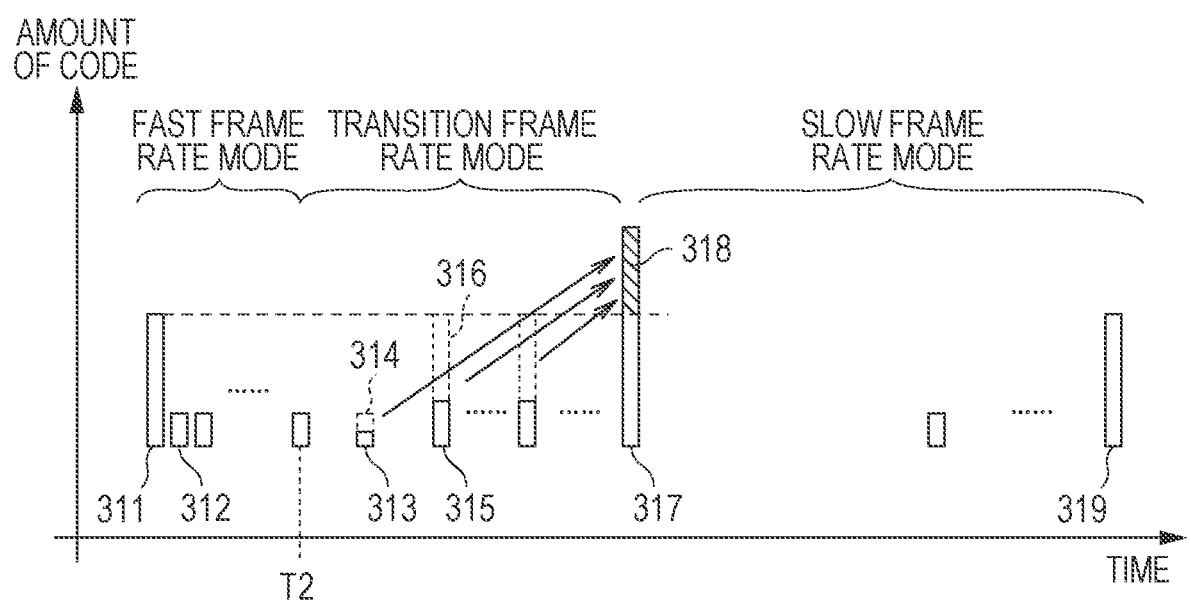
FIG. 5 is a conceptual diagram of moving image compression according to a second embodiment.

FIG. 5 is a conceptual diagram of moving image compression according to the present embodiment and is a diagram where the vertical axis represents an amount of code of each image (frame) distributed by the image processing apparatus 100 and the horizontal axis represents time.

In the present embodiment, as a compression method, a compression method using the in-frame correlation (in-frame prediction) and the interframe correlation (interframe prediction) is adopted. Therefore, in the present embodiment, as a result of compression, two types of frames: a frame (I frame) compressed by using the in-frame correlation and a frame (P frame) compressed by using the interframe correlation are outputted. In general, the amount of code of the I frame is greater than the amount of code of the P frame. Further the quality of image of the I frame is generally better than that of the P frame.

In FIG. 5, a code amount 311 represents the amount of code of the I frame distributed in the fast mode, and a code amount 312 represents the amount of code of the P frame distributed in the fast mode. When a motion of a subject disappears in a frame distributed at time T2, the frame rate mode transits from the fast mode to the transition mode, and thereafter the frame rate mode transits to the slow mode.

In the transition mode, the quantization value is controlled so that a difference between a code amount 313 of the P frame of the transition mode and an average code amount of the P frame of the fast mode becomes a code amount 314. Regarding the I frame, similarly, the quantization value is controlled so that a difference between a code amount 315 of the I frame of the transition mode and an average code amount of the I frame of the fast mode becomes a code amount 316.

The compression control unit 105 assigns the amount of code suppressed in the transition mode to the last frame of the transition mode. Specifically, the compression control unit 105 adds a total of differential code amounts of P frames and a total of differential code amounts of I frames of frames from the first frame to the frame immediately before the last frame of the transition mode. Then, the compression control unit 105 controls the quantization value of the last frame so that a total code amount 318 obtained by the addition is appropriated to the last frame. Here, the last frame of the transition mode is assumed to be an I frame. Thereby, a code amount 317 of the last frame is an amount obtained by adding the total code amount 318 shown by oblique lines to a code amount 319 which is a specified value in the slow mode. Here, the specified value is an amount of code of an I frame compressed according to a quantization value for the slow frame rate.

At this time, the FR control unit 104 determines and controls the frame rate of the transition mode so that the last frame of the transition mode becomes the I frame.

Although the last frame of the transition mode is set to the highest image quality, if there still remains the amount of code to be appropriated, the amount of code may be limited.

The configuration of the image processing apparatus according to the present embodiment is similar to that of the image processing apparatus 100 shown in FIG. 1. However, processing of the FR control unit 104 is different from that of the first embodiment. Therefore, processing different from that of the first embodiment will be mainly described below.

The FR control unit 104 determines the frame rate of the video to be distributed based on the moving object information inputted from the moving object detection unit 103. In the same manner as in the first embodiment, the FR control unit 104 selects the frame rate from among the fast mode, the transition mode, and the slow mode based on the moving object information and determines the frame rate according to the selected mode. At this time, regarding the frame rate of the transition mode, the FR control unit 104 performs adjustment so that the last frame of the transition mode becomes the I frame based on determination information of I frame and P frame from the compression unit 102 and a set I frame cycle.

Figure 6:
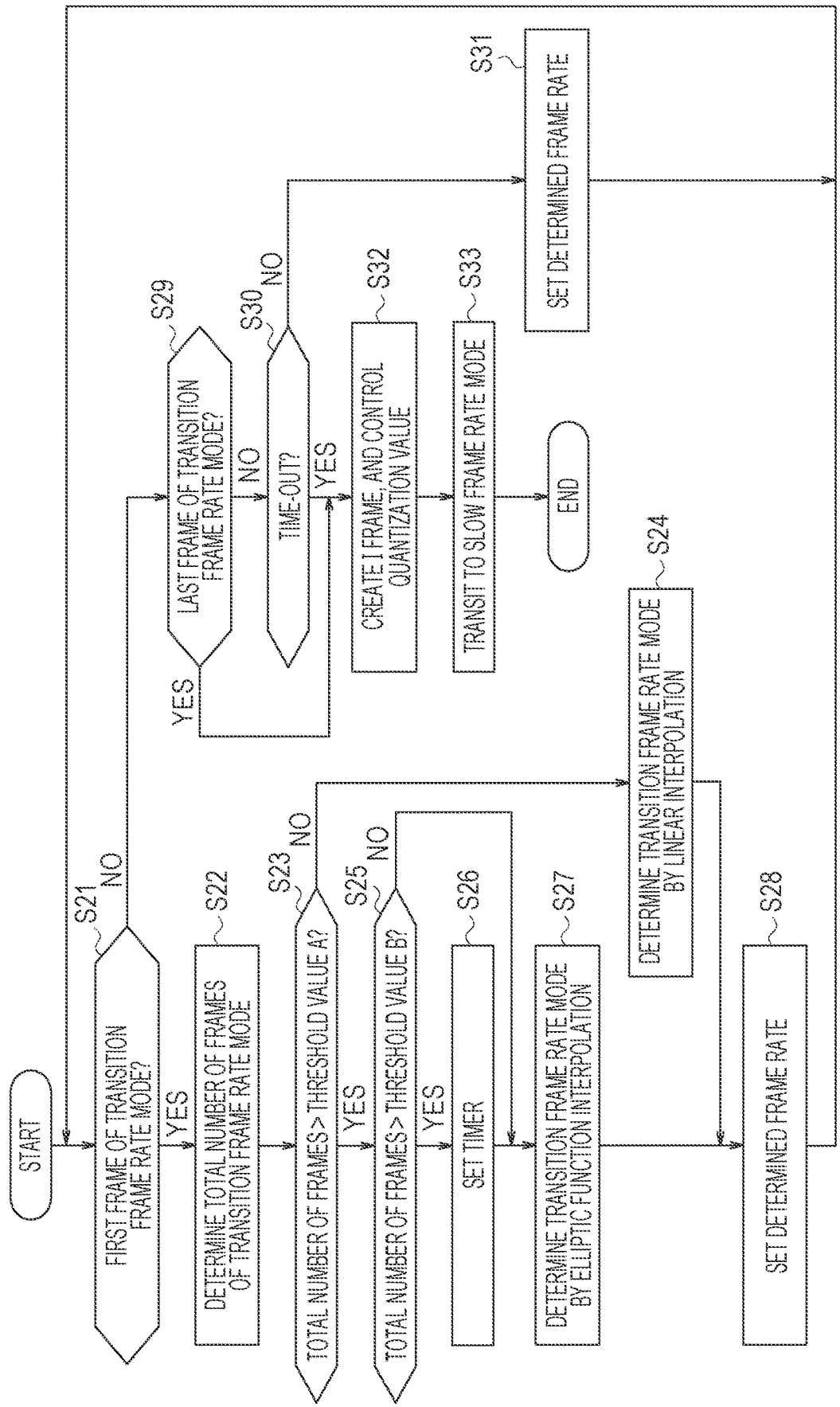
FIG. 6 is a flowchart showing a procedure of moving image compression processing of the second embodiment.

FIG. 6 is a flowchart showing a procedure of moving image compression processing performed by the image processing apparatus 100 of the present embodiment. FIG. 6 is a flowchart showing an operation in the transition mode that is different from the first embodiment. The image processing apparatus 100 can implement each processing shown in FIG. 6 when the CPU 11 reads and executes a necessary program.

First, in S21, the FR control unit 104 determines whether a frame to be processed is the first frame of the transition mode. When determining that the frame to be processed is the first frame, the FR control unit 104 proceeds to S22 to perform initialization, and when determining that the frame to be processed is not the first frame, the FR control unit 104 proceeds to S29.

In S22, the FR control unit 104 calculates a total number of frames to be outputted in the transition mode based on the set I frame cycle. Specifically, the FR control unit 104 calculates the total number of frames N to be outputted in the transition mode by the following formula while assuming that an average of a total number of frames required from an I frame to the next I frame is m and a number of frames from an I frame compressed in the past closest to a current-frame is n.

$$N = m + n \tag{2}$$

Next, in S23, the FR control unit 104 determines whether the total number of frames N calculated in S22 exceeds a preset threshold value A. When the total number of frames N is smaller than or equal to the threshold value A, the FR control unit 104 proceeds to S24, and when the total number of frames N exceeds the threshold value A, the FR control unit 104 proceeds to S25. Here, the threshold value A is, for example, a value as shown below.

$$A = \omega_h - \omega_l \tag{3}$$

Here, $\omega_h$ is the fast frame rate and $\omega_l$ is the slow frame rate.

In S24, the FR control unit 104 calculates the transition frame rate by linear interpolation between the fast frame rate and the slow frame rate. For example, the FR control unit 104 calculates a transition frame rate $\omega_k$ at each time in the transition mode based on the following formula.

[Expression 2]

$$\omega_k = \frac{-(\omega_h - \omega_l)^2}{2N} t + \omega_l \tag{4}$$

Here, t is time (sec) when start time of the transition mode is 0.

In S25, the FR control unit 104 determines whether the total number of frames N calculated in S22 exceeds a preset threshold value B. When the total number of frames N exceeds the threshold value B, the FR control unit 104 proceeds to S26, and when the total number of frames N is smaller than or equal to the threshold value B, the FR control unit 104 proceeds to S27. Here, the threshold value B is, for example, a value as shown below.

[Expression 3]

-continued $$B = \frac{\pi(\omega_h - \omega_l)}{2} \quad (5)$$

In S26, the FR control unit 104 sets a timer for measuring time until time-out of the transition mode and proceeds to S27. Here, the time until time-out is, for example, two seconds. When the total number of frames N exceeds the threshold value B, it is not possible to determine the last frame using a set frame rate, so that a timer is set and a period of the transition mode is determined.

In S27, the FR control unit 104 calculates the transition frame rate by elliptic function interpolation between the fast frame rate and the slow frame rate. For example, the FR control unit 104 calculates the transition frame rate $\omega_k$ at each time in the transition mode based on the following formula.

[Expression 4]

$$\omega_k = (\omega_h - \omega_l)\sqrt{1 - \frac{\pi^2(\omega_h - \omega_l)^2}{16N^2}t^2} \quad (6)$$

The above formula (6) shows that the transition frame rate is temporally varied by connecting the fast frame rate and the slow frame rate with an elliptic function. When connecting by the elliptic function, the number of frames in the transition mode is greater than that when connecting by a straight line, so that it is suitable when the number of frames to the next I frame is large.

In S28, the FR control unit 104 obtains time from a current frame, determines time for compressing the next frame based on the transition frame rate $\omega_k$ calculated in S24 or S27, and returns to S21.

In S29, the FR control unit 104 determines whether the frame to be processed is the last frame of the transition mode. When determining that the frame to be processed is not the last frame of the transition mode, the FR control unit 104 proceeds to S30 and determines whether or not the transition mode is time-out based on the timer set in S26. When the transition mode is not time-out, the FR control unit 104 proceeds to S31, obtains time from the current frame, determines time for compressing the next frame based on the transition frame rate $\omega_k$ calculated in S24 or S27, and returns to S21.

On the other hand, when determining that the frame to be processed is the last frame of the transition mode in S29 or when determining that the transition mode is time-out in S30, the FR control unit 104 proceeds to S32 and performs end processing of the transition mode. Specifically, in S32, the compression control unit 105 creates an I frame and sets a quantization value, where the amount of code of the I frame is an amount of code to which the total code amount of the transition mode described above is appropriated, into the compression unit 102. A calculation method of the quantization value can be, for example, the same as the calculation method of the quantization value for the last frame in the first embodiment.

In S33, the FR control unit 104 sets the frame rate to the slow frame rate, transits from the transition mode to the slow mode, and ends the processing of FIG. 6.

As described above, in the same manner as in the first embodiment, the image processing apparatus 100 according to the present embodiment controls the compression unit 102, suppresses the amounts of code of frames except for the last frame among the frames of the transition mode, and appropriates the suppressed amounts of code for the last frame. Here, the last frame is the frame (I frame) compressed by using the in-frame compression.

In this way, the last frame is the I frame whose image quality is better than that of the P frame that is compressed by using the interframe prediction, so that it is possible to more appropriately improve the image quality at the slow frame rate.

Further, the image processing apparatus 100 has a unit to control the transitional frame rate in the transition mode, so that the image processing apparatus 100 can reliably cause the last frame of the transition mode to be the I frame. As described above, in the present embodiment, the frame immediately before the slow frame rate can be a compressed image using only the in-frame prediction without increasing the entire amount of code of the video, so that it is possible to appropriately improve the image quality at the slow frame rate.

Third Embodiment

Next, a third embodiment of the present disclosure will be described.

In the third embodiment, when an actual compression efficiency is higher than a preset target compression efficiency, an amount of code corresponding to a difference between them is appropriated for the last frame of the transition mode.

The configuration of the image processing apparatus according to the present embodiment is similar to that of the image processing apparatus 100 shown in FIG. 1. However, processing of the compression control unit 105 is different from that of the first embodiment. Therefore, processing different from that of the first embodiment will be mainly described below.

Figure 7:
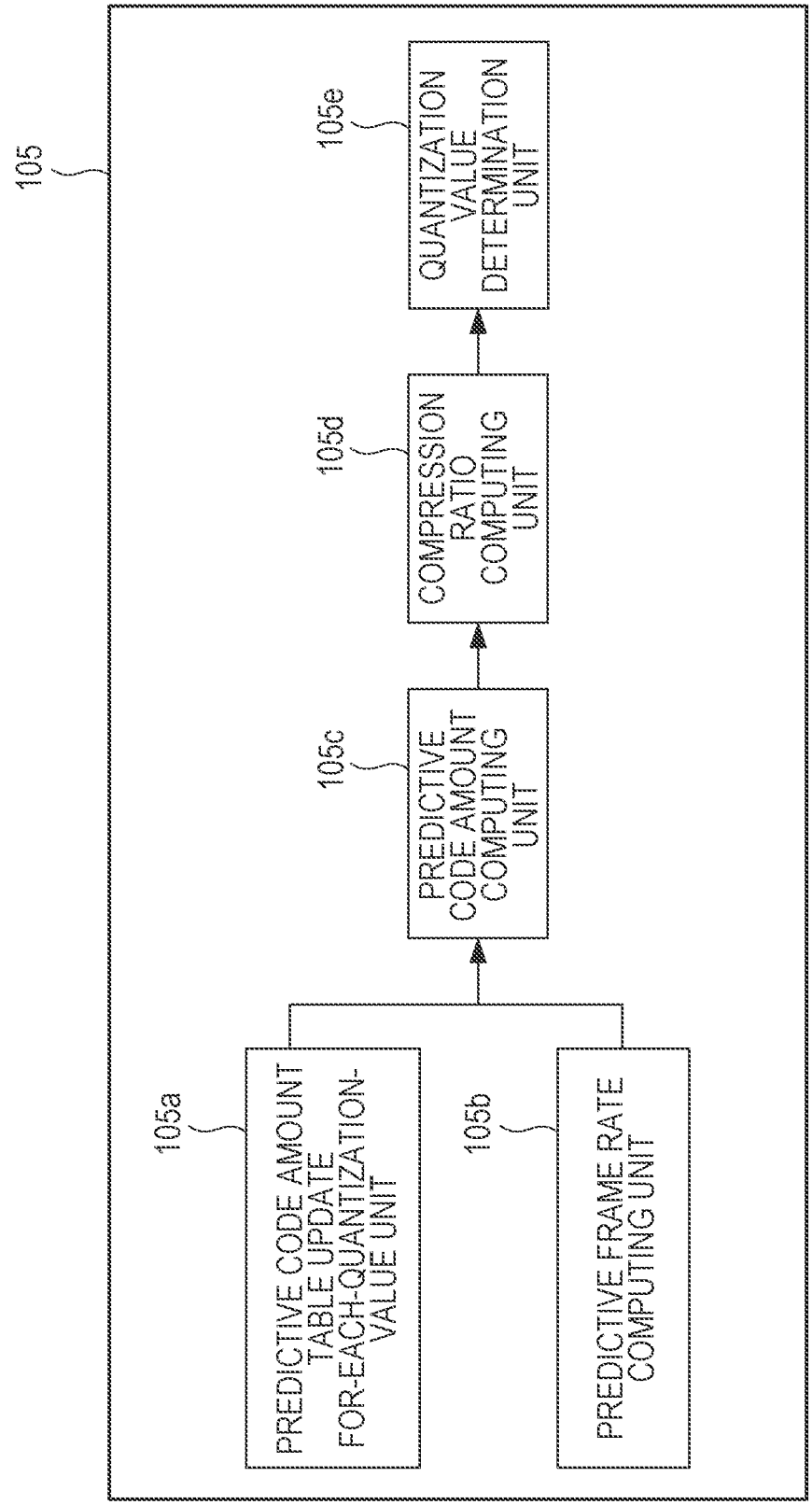
FIG. 7 is a block configuration diagram showing details of a compression control unit of a third embodiment.

FIG. 7 is a block diagram showing an example of a configuration of the compression control unit 105 of the present embodiment. The compression control unit 105 includes a predictive code amount table update for-each-quantization-value unit 105a, a predictive frame rate computing unit 105b, a predictive code amount computing unit 105c, a compression ratio computing unit 105d, and a quantization value determination unit 105e.

Figure 8:
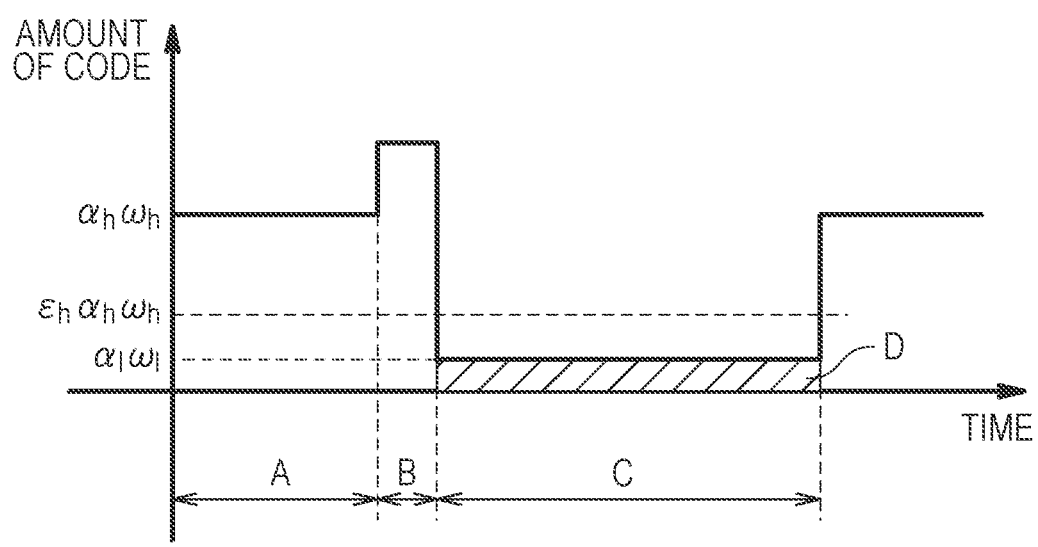
FIG. 8 is a conceptual diagram of moving image compression according to the third embodiment.

Hereinafter, each block shown in FIG. 7 will be described with reference to FIG. 8. FIG. 8 is a graph where the vertical axis represents an amount of code per second and the horizontal axis represents time. A section A is an average holding period (predictive holding period) of the fast frame rate, and the section C is an average holding period (predictive holding period) of the slow frame rate. A section B is a period for improving the image quality of frame and is, for example, a period in which the number of frames is one. In FIG. 8, the fast frame rate is represented by $\omega_h$, an average code amount of frames in the fast mode is represented by $\alpha_h$, the slow frame rate is represented by $\omega_l$, an average code amount of frames in the slow mode is represented by $\alpha_l$, and a preset compression efficiency is represented by $\varepsilon_h$.

The predictive code amount table update for-each-quantization-value unit (hereinafter referred to as a "table update unit") 105a holds a set quantization value and an amount of code of a frame compressed by the compression unit 102 according to the quantization value as a table. The table update unit 105a updates the table every time a frame is compressed. An updated value may be a result of a moving average of 50 times. Thereby, the amount of code is determined for each quantization value. In FIG. 8, the average code amount $\alpha_h$ in the fast mode and the average code amount $\alpha_l$ in the slow mode are values provided by the table update unit 105a.

When the frame rate mode transits to the transition mode, the predictive frame rate computing unit 105b predicts a holding period of the slow mode to which the frame rate mode transits thereafter. Specifically, the predictive frame rate computing unit 105b predicts the holding period of the slow mode from statistic information of the holding period of the past slow mode determined by the FR control unit 104. For example, the predictive frame rate computing unit 105b may calculate an average of the past 50 holding periods of the slow mode by using a moving average and use the average as a prediction value. The holding period of the past slow mode is determined according to a detection frequency of a moving object in the video. Therefore, the predictive frame rate computing unit 105b predicts the holding period of the slow mode based on the statistic information of the moving object detection.

Further, the predictive frame rate computing unit 105b can also predict a holding period of the fast mode in the same manner. In FIG. 8, values of the period A and the period C are values provided by predictive frame rate computing unit 105b.

The predictive code amount computing unit 105c predicts the amount of code of the video distributed in the slow mode and outputs the predicted amount of code as a predictive code amount. Specifically, the predictive code amount computing unit 105c uses the average code amount $\alpha_l$ of the slow mode obtained from the table updated by the table update unit 105a, the slow frame rate $\omega_l$, and the holding period C of the slow mode predicted by the predictive frame rate computing unit 105b. In FIG. 8, a value of an area D shown by oblique lines is a value provided by the predictive code amount computing unit 105c.

The compression ratio computing unit 105d predicts an actual compression efficiency when the amount of code of the video is compressed to the predictive code amount in the predicted holding period of the slow mode. Specifically, the compression ratio computing unit 105d calculates a ratio between a first code amount when the fast mode is used at all times in the periods A to C in FIG. 8 and a second code amount when the fast mode is used in the periods A and B and the slow mode is used in the period C as the actual compression efficiency.

The compression ratio computing unit 105d can calculate the first code amount by using the average code amount $\alpha_h$ in the fast mode obtained from the table described above, the fast frame rate $\omega_h$, the average holding period A of the fast mode, and the average holding period C of the slow mode. Further, the compression ratio computing unit 105d can calculate the second code amount by using the average code amount $\alpha_h$ in the fast mode obtained from the table described above, the fast frame rate $\omega_h$, the average holding period A of the fast mode, and the predictive code amount computed by the predictive code amount computing unit 105c.

The quantization value determination unit 105e compares the actual compression efficiency calculated by the compression ratio computing unit 105d with a predetermined target compression efficiency and determines the quantization value for the last frame of the transition mode based on a result of the comparison. First, when the actual compression efficiency is higher than the target compression efficiency, the quantization value determination unit 105e computes an amount of code to be assigned to the last frame of the transition frame according to a difference between them and calculates an added amount of code where the amount of code to be assigned to the last frame of the transition frames is added to the average code amount $\alpha_h$ in the fast mode. Next, the quantization value determination unit 105e calculates a quantization value where an amount of code becomes the added amount of code as a result of compression of the last frame from the table, and determines the calculated quantization value as the quantization value for the last frame of the transition mode.

Specifically, the quantization value determination unit 105e calculates a code amount X that satisfies the following formula and calculates a quantization value that satisfies the calculated code amount X as the quantization value for the last frame.

$$\varepsilon_h \alpha_h \omega_h (A+B+C) = A\alpha_h \omega_h + BX + C\alpha_l \omega_l \quad (7)$$

In the present embodiment, the quantization value determination unit 105e determines a difference between the amount of code of video when the compression efficiency becomes the target compression efficiency in the period (A+B+C) and the second code amount as the amount of code to be assigned to the last frame.

Figure 9:
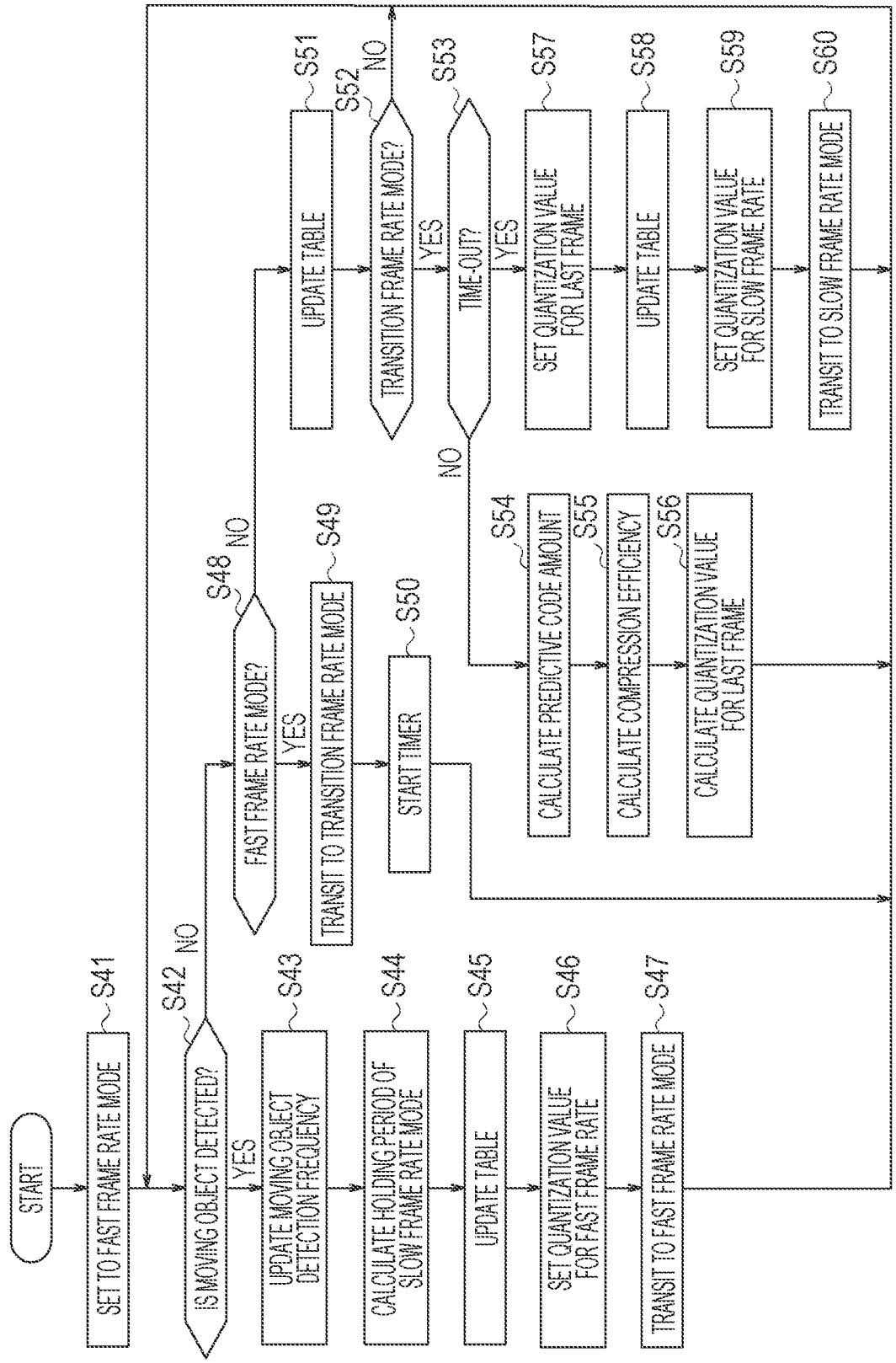
FIG. 9 is a flowchart showing a procedure of moving image compression processing of the third embodiment.

FIG. 9 is a flowchart showing a procedure of moving image compression processing performed by the image processing apparatus 100 of the present embodiment. The moving image compression processing is processing that improves image quality in the slow mode when performing frame rate control that changes the frame rate according to the presence or absence of a moving object in a video. The processing of FIG. 9 is started at a timing when the image processing apparatus 100 is started. However, a start timing of the processing of FIG. 9 is not limited to the aforementioned timing. The image processing apparatus 100 can implement each processing shown in FIG. 9 when the CPU 11 reads and executes a necessary program.

First, in S41, the FR control unit 104 performs initialization and selects the fast mode as the frame rate mode.

Next, in S42, the FR control unit 104 is inputted with the moving object information from the moving object detection unit 103 and determines whether a moving object is detected from a video. When the moving object is detected, the FR control unit 104 proceeds to S43, and when no moving object is detected, the FR control unit 104 proceeds to S48. In S43, the compression control unit 105 updates a moving object detection frequency and proceeds to S44.

In S44, the compression control unit 105 predicts a holding period of the slow mode based on the moving object detection frequency. At this time, the compression control unit 105 also predicts a holding period of the fast mode. In S45, the compression control unit 105 updates a table where the average code amount and the quantization value are associated with each other, and proceeds to S46. In S46, the compression control unit 105 sets the quantization value for the fast frame rate to the compression unit 102 and proceeds to S47. In S47, the FR control unit 104 sets the frame rate to the fast frame rate, transits to the fast mode, and returns to S42.

In S48, the FR control unit 104 determines whether the current frame rate mode is the fast mode. When determining that the current frame rate mode is the fast mode, the FR control unit 104 proceeds to S49, and when determining that the current frame rate mode is not the fast mode, the FR control unit 104 proceeds to S51. In S49, the FR control unit 104 transits from the fast mode to the transition mode. At this time, the FR control unit 104 initializes the transition mode and sets the frame rate to the transition frame rate. In S50, the FR control unit 104 starts a timer for measuring time until time-out of the transition mode, and returns to S42.

In S51, the compression control unit 105 updates a table of an average code amount of compressed frames and the quantization value. In S52, the FR control unit 104 determines whether the current frame rate mode is the transition mode. When determining that the current frame rate mode is the transition mode, the FR control unit 104 proceeds to S53, and when determining that the current frame rate mode is not the transition mode, the FR control unit 104 returns to S42.

In S53, the FR control unit 104 determines whether the transition mode is time-out. When the transition mode is not time-out, the FR control unit 104 proceeds to S54.

In S54, the compression control unit 105 calculates a predictive code amount in the slow mode based on information obtained from the updated table and the holding period of the slow mode predicted in S44, and proceeds to S55.

In S55, the compression control unit 105 calculates an actual compression efficiency by using the predictive code amount, and proceeds to S56.

In S56, the compression control unit 105 compares the actual compression efficiency calculated in S55 with a predetermined target compression efficiency. When the compression control unit 105 determines that the actual compression efficiency is higher than the target compression efficiency, the compression control unit 105 assigns an amount of code corresponding to a difference between them to the last frame of the transition mode and calculates an amount of code for the last frame. Further, the compression control unit 105 calculates a quantization value from the calculated amount of code for the last frame, updates the quantization value as the quantization value for the last frame of the transition mode, and returns to S42.

On the other hand, when determining that the transition mode is time-out in S53, the FR control unit 104 proceeds to S57. In S57, the compression control unit 105 sets the quantization value for the last frame to the compression unit 102 and returns to S58. In S58, after completing compression of the last frame, the compression control unit 105 updates the table of the average code amount and the quantization value and proceeds to S59.

In S59, the compression control unit 105 sets the quantization value for the slow frame rate to the compression unit 102 and proceeds to S60. In S60, the FR control unit 104 sets the frame rate to the slow frame rate, transits to the slow mode, and returns to S42.

As described above, the image processing apparatus 100 according to the present embodiment predicts the holding period of the fast mode and the holding period of the slow mode based on the statistic information of the moving object detection. Further, the image processing apparatus 100 predicts the compression efficiency of the video based on the predicted holding periods of the fast mode and the slow mode. When the predicted compression efficiency is higher than the target compression efficiency, the image processing apparatus 100 determines an amount of code to be appropriated for the last frame of the transition mode based on a difference between the compression efficiency and the target compression efficiency.

In this way, the compression efficiency is allowed to be lowered to the target compression efficiency, and the amount of code of the last frame of the transition mode is increased. Specifically, the amount of code of the last frame of the transition mode can be increased to be greater than the specified value within a range where the entire amount of code of the video does not exceed the amount of code (the target amount of code) when the compression efficiency becomes the target compression efficiency. Therefore, it is possible to improve the image quality at the slow frame rate while maintaining the reduction of the entire amount of code of the video by the frame rate control.

The image processing apparatus 100 computes a ratio between the first code amount in a case when the video is distributed at the fast frame rate in the period (A+B+C) of FIG. 8 and the second code amount in a case when the video is distributed at the fast frame rate in the period (A+B) and the video is distributed at the slow frame rate in the period C. The image processing apparatus 100 predicts the computed value as the actual compression efficiency.

In this way, the image processing apparatus 100 predicts the holding period of the fast mode (the period A) and the holding period of the slow mode (the period C) based on the statistic information of the moving object detection, so that the image processing apparatus 100 can appropriately predict the holding period of each mode and can accurately predict the compression efficiency. Therefore, it is possible to appropriately determine the amount of code to be appropriated for the last frame of the transition mode.

Here, the image processing apparatus 100 can determine a difference between the amount of code of the video in a case when the compression efficiency becomes the target compression efficiency in the period (A+B+C) and the second code amount as the amount of code to be appropriated for the last frame. In this case, it is possible to appropriate the amount of code for the last frame of the transition mode so that the entire amount of code of the video becomes the target amount of code. Therefore, it is possible to apply the quantization value of the highest image quality within a range of allowable compression efficiency to the last frame of the transition mode, so that it is possible to more appropriately improve the image quality at the slow frame rate.

Fourth Embodiment

Next, a fourth embodiment of the present disclosure will be described.

In the fourth embodiment, an image is divided into a plurality of areas and the frame rate is controlled for each divided partial area.

In the present embodiment, when the detection frequency of a moving object varies for each partial area, an effective frame rate of each area is controlled by reducing or eliminating an image code amount for each partial area, so that it is possible to reduce the amount of code. Further, in the present embodiment, in the same manner as in the third embodiment described above, the amount of code is appropriated for the last frame of the transition mode according to a difference between the actual compression efficiency and the target compression efficiency in order to improve the image quality of partial areas in the slow mode.

Figure 10:
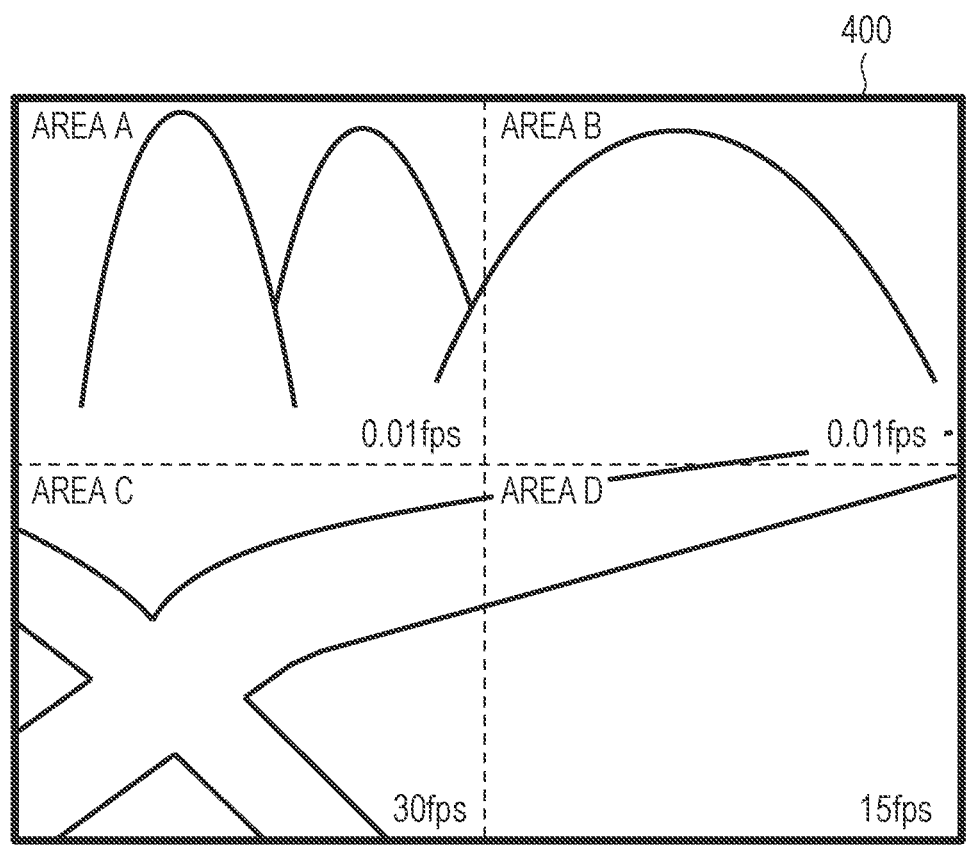
FIG. 10 is a diagram for explaining a frame rate control for each area.

It is possible to reduce or eliminate the image code amount in each partial area by, for example, forcibly inserting a skip macroblock of H.264. An area segmentation in a screen may be predetermined. For example, as shown in FIG. 10, an image 400 may be divided into four areas.

In the image 400, an area A and an area B are areas to be background images, and an appearance ratio of a moving object is low in these areas. An area C is an area including an intersection. The appearance ratio of a moving object is high in the area C. The appearance ratio of a moving object in the area D is lower than that in the area C. In this case, in the area A and the area B, the slow mode is set and, for example, the frame rate is effectively set to 0.01 fps. In the area C and the area D, the fast mode is set. For example, the frame rate is set to 30 fps in the area C, and the frame rate is set to 15 fps in the area D.

The configuration of the image processing apparatus according to the present embodiment is the same as that of the image processing apparatus according to the third embodiment and is the same as that of the image processing apparatus 100 shown in FIG. 1. However, processing of the compression control unit 105 is different from that of the third embodiment. Therefore, processing different from that of the third embodiment will be mainly described below.

Figure 11:
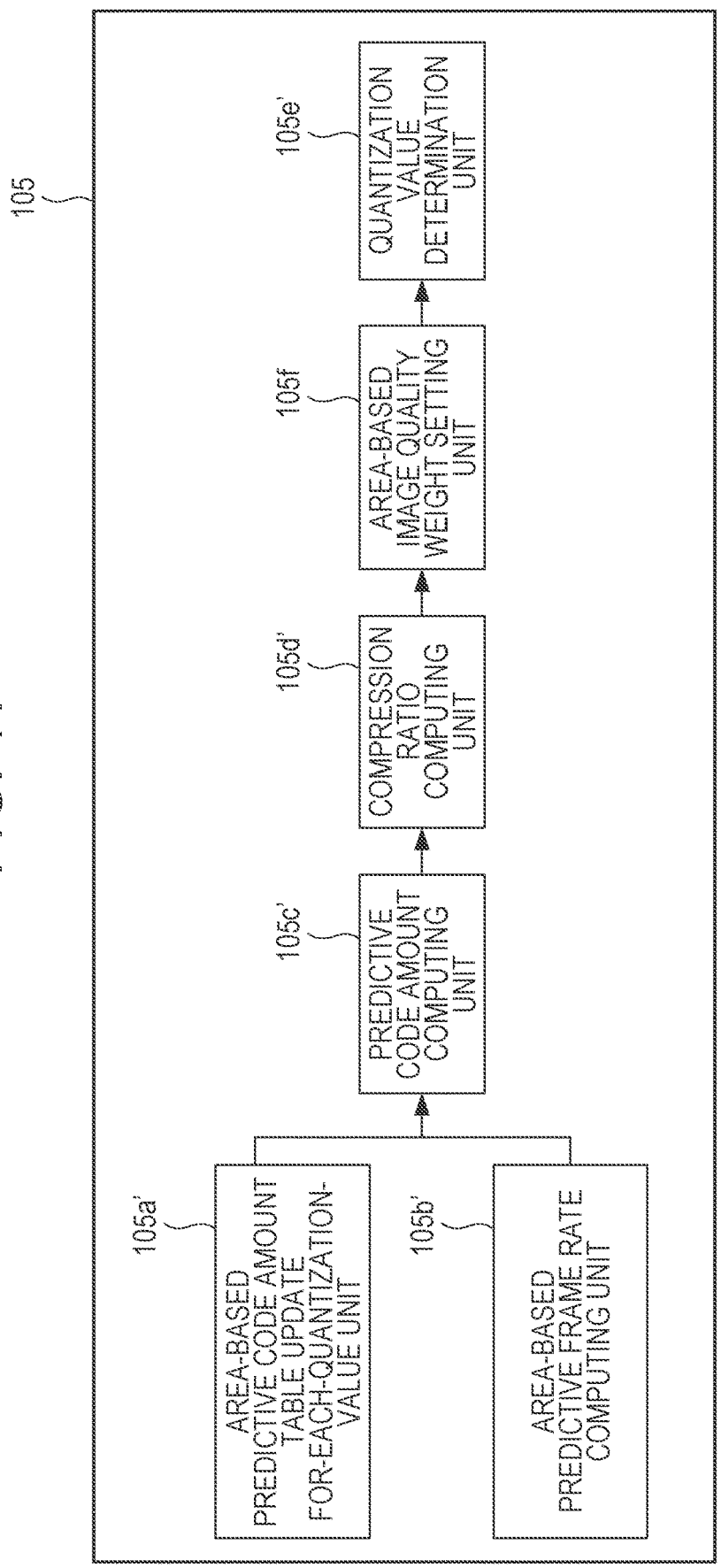
FIG. 11 is a block configuration diagram showing details of a compression control unit of a fourth embodiment.

FIG. 11 is a block diagram showing an example of a configuration of the compression control unit 105 according to the present embodiment. The compression control unit 105 includes an area-based predictive code amount table update for-each-quantization-value unit 105$a'$, an area-based predictive frame rate computing unit 105$b'$, a predictive code amount computing unit 105$c'$, and a compression ratio computing unit 105$d'$. The compression control unit 105 further includes an area-based image quality weight setting unit 105$f$ and a quantization value determination unit 105$e'$.

Processing of the area-based predictive code amount table update for-each-quantization-value unit 105$a'$, the area-based predictive frame rate computing unit 105$b'$, the predictive code amount computing unit 105$c'$, and the compression ratio computing unit 105$d'$ corresponds to that of each block 105$a$ to 105$d$ shown in FIG. 7 except for differences of areas. Processing of the quantization value determination unit 105$e'$ corresponds to that of the quantization value determination unit 105$e$ shown in FIG. 7 except for differences of areas.

The area-based image quality weight setting unit 105$f$ compares the actual compression efficiency calculated by the compression ratio computing unit 105$d'$ with a predetermined target compression efficiency. When the actual compression efficiency is higher than the target compression efficiency, the area-based image quality weight setting unit 105$f$ assigns an amount of code corresponding to a difference between them to the last frame of the transition mode and calculates an amount of code where the amount of code to be assigned to the last frame of the transition frames is added to the amount of code in the fast mode.

In this case, when there are areas that become the transition mode at the same time, amounts of code may be equally assigned to these areas or the amounts of code assigned to these areas may be weighted. For example, dispersions of code amounts for the past 30 frames of each area may be calculated, and weight may be set so that an amount of code inversely proportional to the dispersion of the amount of code is assigned. In other words, the weight may be set based on a ratio of the inverse of the dispersion of the amount of code.

As described above, the image processing apparatus 100 according to the present embodiment determines the frame rate for each partial area obtained by dividing a flame into a plurality of areas. When the image processing apparatus 100 distributes a video at a frame rate determined for each partial area, the image processing apparatus 100 simulatively controls the frame rate for each partial area by inserting a skip macroblock into the partial area. Thereby, it is possible to effectively control the frame rate of each area.

Further, the image processing apparatus 100 controls the compression unit 102 and determines the amount of code of the last frame among the frames of a partial area distributed at the transitional frame rate based on a ratio of the inverse of the dispersion of the amount of code of each partial area. Thereby, it is possible to set a quantization value for achieving higher image quality on an area having the lowest dispersion and converge a code amount dispersion difference of each area.

Other Embodiments

The present invention can be realized by processing where a program realizing one or more functions of the embodiments described above is supplied to a system or an apparatus through a network or a storage medium and one or more processors in a computer of the system or the apparatus reads and executes the program. Alternatively, the present invention can be realized by a circuit (for example, ASIC) that realizes one or more functions.

According to the embodiments described above, it is possible to suppress degradation of video image quality when the frame rate is controlled to a second frame rate lower than a first frame rate while the reduction of the entire amount of code of the video is realized by the frame rate control.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-165065, filed Sep. 4, 2018, which is hereby incorporated by reference herein in its entirety.

What is claimed is:

1. A video data generation apparatus that performs generation processing for generating video data, the video data generation apparatus comprising:
a frame rate determination unit configured to determine a frame rate of the video data;

a code amount determination unit configured to determine a target code amount that can be used in each frame of the video data; and an encoding unit configured to perform the generation processing for generating the video data according to the frame rate determined by the frame rate determination unit and the code amount determined by the code amount determination unit, wherein when the frame rate determination unit changes, in a first frame, the frame rate of the video data from a first frame rate to a second frame rate lower than the first frame rate, the code amount determination unit makes at least a target code amount in a frame immediately before the first frame smaller than when the frame rate is not changed from the first frame rate to the second frame rate in the first frame, and makes a target code amount in the first frame greater than when the frame rate is not changed from the first frame rate to the second frame rate in the first frame.

2. The video data generation apparatus according to claim 1, further comprising:

a detection unit configured to perform moving object detection processing that detects a moving object from a video, wherein the frame rate determination unit determines the frame rate based on a result of the moving object detection processing performed by the detection unit.

3. The video data generation apparatus according to claim 2, wherein the moving object detection processing is processing that uses a background difference method and the detection unit determines that a foreground detected by the moving object detection processing is a moving object.

4. The video data generation apparatus according to claim 2, wherein when changing the frame rate in the video data from a predetermined frame rate higher than the first frame rate to the second frame rate according to the result of the moving object detection processing, the frame rate determination unit changes the frame rate from the predetermined frame rate to the second frame rate, and thereafter changes the frame rate from the second frame rate to the first frame rate.

5. The video data generation apparatus according to claim 2, wherein the frame rate determination unit determines a first period in which the video data is generated at the first frame rate and a second period in which the video data is generated at the second frame rate based on statistic information pertaining to the result of the moving object detection processing.

6. The video data generation apparatus according to claim 1, wherein the frame rate determination unit determines the frame rate for each partial area obtained by dividing the flame into a plurality of areas.

7. The video data generation apparatus according to claim 6, wherein the encoding unit changes a frame rate for each partial area by inserting a skip macroblock into the partial area according to the frame rate determined by the frame rate determination unit.

8. The video data generation apparatus according to claim 1, wherein the first frame is encoded by using an in-frame prediction.

9. The video data generation apparatus according to claim 1, further comprising:

a distribution unit configured to distribute the video data.

10. A video data generation method that performs generation processing for generating video data, the video data generation method comprising:

a frame rate determination step of determining a frame rate of the video data;

a code amount determination step of determining a target code amount that can be used in each frame of the video data; and an encoding step of performing the generation processing for generating the video data according to the frame rate determined in the frame rate determination step and the code amount determined in the code amount determination step, wherein when the frame rate of the video data is changed from a first frame rate to a second frame rate lower than the first frame rate in a first frame in the frame rate determination step, in the code amount determination step, at least a target code amount in a frame immediately before the first frame is made smaller than when the frame rate is not changed from the first frame rate to the second frame rate in the first frame, and a target code amount in the first frame is made greater than when the frame rate is not changed from the first frame rate to the second frame rate in the first frame.

11. A non-transitory recording medium that records a program for causing a computer to perform a video data generation method of performing generation processing for generating video data, the method comprising:

a frame rate determination step of determining a frame rate of the video data;

a code amount determination step of determining a target code amount that can be used in each frame of the video data; and an encoding step of performing the generation processing for generating the video data according to the frame rate determined in the frame rate determination step and the code amount determined in the code amount determination step, wherein when the frame rate of the video data is changed from a first frame rate to a second frame rate lower than the first frame rate in a first frame in the frame rate determination step, in the code amount determination step, at least a target code amount in a frame immediately before the first frame is made smaller than when the frame rate is not changed from the first frame rate to the second frame rate in the first frame, and a target code amount in the first frame is made greater than when the frame rate is not changed from the first frame rate to the second frame rate in the first frame.

* * * * *

UNITED STATES PATENT AND TRADEMARK OFFICE
CERTIFICATE OF CORRECTION

PATENT NO. : 11,321,390 B2
APPLICATION NO. : 16/541983
DATED : May 3, 2022
INVENTOR(S) : Takeo Umesawa It is certified that error appears in the above-identified patent and that said Letters Patent is hereby corrected as shown below:

On the Title Page

(73) The Assignee name should read: Canon Kabushiki Kaisha.

Signed and Sealed this
Twenty-seventh Day of December, 2022

Katherine Kelly Vidal
*Director of the United States Patent and Trademark Office*